United States Patent
Liu

(10) Patent No.: US 9,967,812 B2
(45) Date of Patent: *May 8, 2018

(54) NETWORK ACCESS METHOD AND MOBILE COMMUNICATION TERMINAL

(71) Applicant: Guangdong Oppo Mobile Telecommunications Corp., Ltd., Dongguan (CN)

(72) Inventor: Hai Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/329,423

(22) PCT Filed: Mar. 22, 2016

(86) PCT No.: PCT/CN2016/077012
§ 371 (c)(1),
(2) Date: Jan. 26, 2017

(87) PCT Pub. No.: WO2016/173336
PCT Pub. Date: Nov. 3, 2016

(65) Prior Publication Data
US 2017/0215136 A1    Jul. 27, 2017

(30) Foreign Application Priority Data

Apr. 30, 2015 (CN) .......................... 2015 1 0217896

(51) Int. Cl.
*H04W 48/18* (2009.01)
*H04W 48/16* (2009.01)
*H04W 60/04* (2009.01)

(52) U.S. Cl.
CPC ........... *H04W 48/18* (2013.01); *H04W 48/16* (2013.01); *H04W 60/04* (2013.01)

(58) Field of Classification Search
CPC ...... H04W 48/18; H04W 48/16; H04W 60/04
See application file for complete search history.

(56) References Cited

U.S. PATENT DOCUMENTS

| 2009/0116441 A1* | 5/2009 | Park | H04W 48/18 370/329 |
|---|---|---|---|
| 2011/0080849 A1* | 4/2011 | Choi | H04W 48/16 370/254 |

(Continued)

FOREIGN PATENT DOCUMENTS

| CN | 1802025 A | 7/2006 |
|---|---|---|
| CN | 101657005 A | 2/2010 |

(Continued)

*Primary Examiner* — Brandon J Miller
(74) *Attorney, Agent, or Firm* — JMB Davis Ben-David

(57) ABSTRACT

Disclosed are a network access method and a mobile communication terminal, comprising: upon detecting the type of a subscriber identity module being inserted for the first time into a mobile communication terminal, public land mobile networks (PLMNs) of a network format supported by the mobile communication terminal are determined on the basis of the type of the subscriber identity module; network identities of the PLMNs of the network format supported by the mobile communication terminal as determined are added to an equivalent public land mobile network (EPLMN) list; and finally, when a PLMN matching either network identity in the EPLMN list is found, a communication connection between the mobile communication terminal and the matching PLMN is established.

15 Claims, 4 Drawing Sheets

(56) References Cited

U.S. PATENT DOCUMENTS

| | | | |
|---|---|---|---|
| 2011/0086670 A1* | 4/2011 | Shin | H04W 8/205 455/558 |
| 2012/0064883 A1* | 3/2012 | Kim | H04W 8/205 455/422.1 |
| 2013/0267229 A1 | 10/2013 | Gopalakrishnan | |
| 2014/0235241 A1* | 8/2014 | Sharan | H04W 60/04 455/435.2 |
| 2015/0045044 A1* | 2/2015 | Liu | H04W 4/005 455/450 |
| 2015/0215849 A1* | 7/2015 | Patel | H04W 48/16 455/435.2 |
| 2015/0282060 A1* | 10/2015 | Huang-Fu | H04W 8/205 455/435.2 |

FOREIGN PATENT DOCUMENTS

| | | |
|---|---|---|
| CN | 101715248 A | 5/2010 |
| CN | 101815284 A | 8/2010 |
| CN | 101932079 A | 12/2010 |
| CN | 103068009 A | 4/2013 |
| CN | 103379567 A | 10/2013 |
| CN | 104115512 A | 10/2014 |
| CN | 104853411 A | 8/2015 |
| WO | 2014128641 A1 | 8/2014 |

\* cited by examiner

NETWORK ACCESS METHOD AND MOBILE COMMUNICATION TERMINAL

CROSS REFERENCE TO RELATED APPLICATION

This application is the US national stage of International Application No. PCT/CN2016/077012, filed on Mar. 22, 2016, which claims priority to Chinese Application No. 201510217896.3, filed Apr. 30, 2015. The entire disclosures of each of the above applications are incorporated herein by reference

BACKGROUND OF THE DISCLOSURE

1. Field of the Disclosure

The present disclosure relates to the field of mobile communication technology, and more particularly, to a method of connecting to networks and a mobile communication terminal.

2. Description of the Related Art

Public land mobile network (PLMN) is a network built and operated by the government or operators approved by the government for the purpose of providing land-bound mobile communication services for the public. The network is usually connected to public switched telephone network (PSTN), forming a communication network that covers a whole region or country.

A network identity of the PLMN is usually just a string of numbers. For example, the network identity of PLMN of China Mobile is 46000, and the network identity of PLMN of China Unicom is 46001. Through the mobile networks provided by each operator, users can enjoy rapid and convenient communication. The number of users carrying communication terminals has been on the rise as people's living network standard elevates. When a user inserts a new user identification card into a mobile communication terminal for the first time, the mobile communication terminal (e.g. a cell phone) must search a network to acquire the network identity of the PLMN. However, when the user inserts the new user identification card into the mobile communication terminal for the first time, it usually takes the terminal a long time (sometimes even as long as ten to twenty minutes) to search the network. And, only when the terminal successfully found the network can it connect to the PLMN of the current location. It significantly influences users' communication experience.

SUMMARY

The embodiment of the present disclosure provides a method and mobile communication terminal for accessing to a network and reducing the time needed to connect to a PLMN, thus greatly improves users' communication experience.

The present disclosure proposes a method for accessing to a network. The method includes follows.

A type of user identification card inserted into a mobile communication terminal in a first time is detected.

A public land mobile network (PLMN) in compliance with a network standard supported by the mobile communication terminal based on the type of user identification card is determined.

A network identity of the determined PLMN in compliance with the network standard supported by the mobile communication terminal is added to an equivalent public land mobile network (EPLMN) list.

A communication connection between the mobile communication terminal is established and a matching PLMN upon a condition that the matching PLMN is found to match the network identity in the EPLMN list.

The present disclosure also proposes a mobile communication terminal. The mobile communication terminal includes a detecting unit, a determining unit, an adding unit, and an accessing unit.

The detecting unit is configured to detect a type of user identification card inserted into a mobile communication terminal in a first time.

The determining unit is configured to determine a public land mobile network (PLMN) in compliance with a network standard supported by the mobile communication terminal based on the type of user identification card detected by the detecting unit.

The adding unit is configured to add a network identity of the determined PLMN in compliance with the network standard supported by the mobile communication terminal to an equivalent public land mobile network (EPLMN) list.

The accessing unit is configured to establish a communication connection between the mobile communication terminal and a matching PLMN if the matching PLMN is found to match the network identity in the EPLMN list after the network identity have been added into the list by the adding unit.

In the embodiment of the present disclosure, after the type of user identification card inserted into a mobile communication terminal for the first time is detected, the PLMN in compliance with the network standard supported by the mobile communication terminal is determined based on the type of user identification card. The network identity of the determined PLMN in compliance with the network standard supported by the mobile communication terminal is added to an equivalent public land mobile network (EPLMN) list. Finally, when a PLMN matches a network identity in the EPLMN list, a communication connection between the mobile communication terminal and the matching PLMN is established. The embodiment of the present disclosure adds the network identities of the determined PLMN in compliance with the network standards supported by the mobile communication terminal into the EPLMN list. The EPLMN list stores network identities of PLMNs that are regarded as equivalent to a certain extent by the mobile communication terminal. Therefore, when the mobile communication terminal connects to a network based on the EPLMN list, which has stored network identities of PLMN in compliance with the network standards supported by the mobile communication terminal, it searches networks based on the current location when it is inserted with a user identification card for the first time. Thus it significantly heightens the chance of finding a PLMN whose network identity matches a network identity that is already stored in the EPLMN list during the process of network searching, as well as the possibility of the mobile communication terminal connecting to a network at the current location. It is instrumental in minimizing the waiting time when users are communicating (ideally, it only takes a few seconds for the mobile communication terminal to complete network connection), and thus is instrumental in greatly improve users' communication experience.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, those of ordinary skill in this field can obtain other figures according to these figures without paying the premise.

DETAILED DESCRIPTION OF PREFERRED EMBODIMENTS

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

The embodiment of the present disclosure proposes a method and mobile communication terminal for accessing to a network to reduce the time needed for the mobile communication terminal to connect to a PLMN, thus greatly improves users' communication experience.

Figure 1:
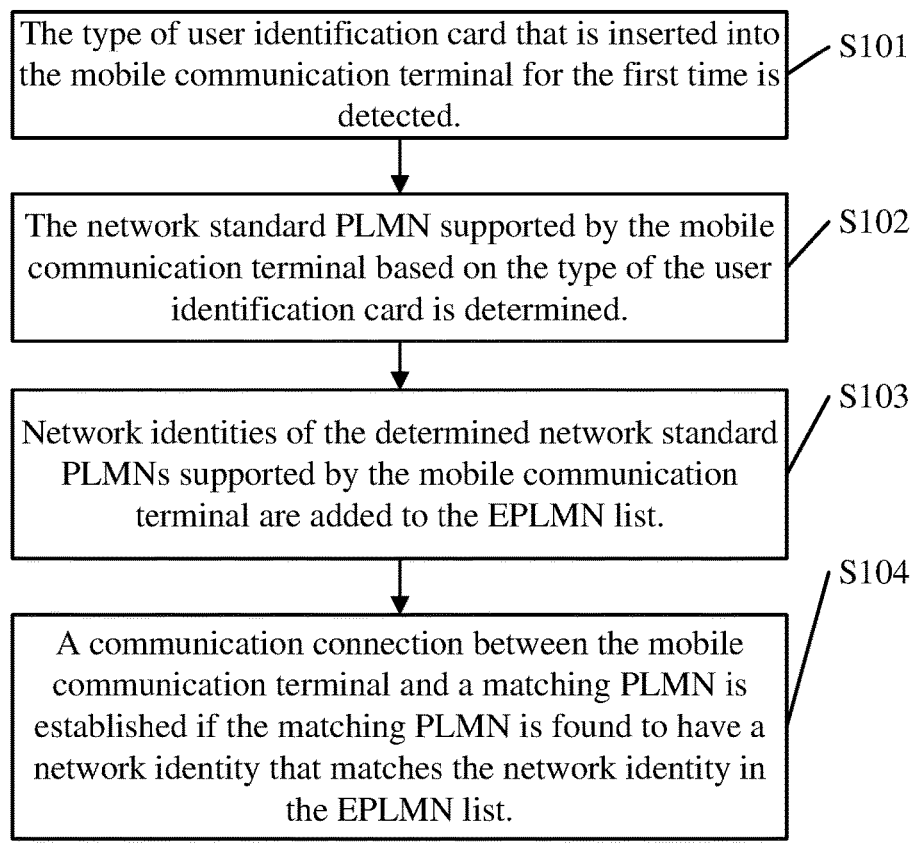
FIG. 1 is a flow chart of the method for accessing to a network according to an embodiment of the present disclosure.

Please refer to FIG. 1. FIG. 1 is a flow chart of the method for accessing to a network according to an embodiment of the present disclosure. It can be applied to mobile communication terminals such as smart phones (e.g. android phones, iOS phones, and so on). The method for accessing to a network includes following blocks:

S101: The type of user identification card that is inserted into the mobile communication terminal for the first time is detected.

In the embodiment of the present disclosure, detecting the type of user identification card is to determine network standards that the mobile communication terminal supports. Network standard refers to the type of the network. Types of network standards commonly seen in China are code division multiple access (CDMA), with mobile phones using CDMA 1× at frequency band 800 MHz; global system for mobile communication (GSM), with mobile phones using frequency bands 900/1800/1900 MHZ; GSM 1× dual-mode (i.e. wideband CDMA, WCDMA) in the recent two years, taking frequency bands 900/1800 HMZ; 3G mobile communication technology, taking frequency bands 900/1800/1900/2100 HMZ; and 4G technology, taking frequency bands 1920-2170 MHZ.

In the embodiment of the present disclosure, a user identification card can be a subscriber identity module (SIM) card. More specifically, when the mobile communication terminal powers on, the first thing it detects is the type of user identification card inserted into the socket of the mobile communication terminal.

S102: The PLMN in compliance with the network standard supported by the mobile communication terminal based on the type of the user identification card is determined.

In the embodiment of the present disclosure, PLMN is a network built and operated by the government or operators approved by the government for the purpose of providing land-bound mobile communication services for the public. The network is usually connected to PSTN, forming a communication network that covers a whole region or country. For example, the network identity of PLMN of China Mobile is 46000, and the network identity of China Unicom is 46001. PLMN is a wireless communication system, inclined to be accessed by land-bound users riding on transportation tools or moving on foot. Such a system can be independent, but it is usually connected to a landline telephone system, such as PSTN. However, there are also more and more mobile and portable Internet users. An ideal PLMN system provides services to mobile and portable users equivalent to that provides to landline users. It can be especially challenging in areas with complicated terrains, because it is difficult to find and maintain a base station. There are also many obstacles in an urban environment, such as noises and interfering radiation that can be evoked by buildings and radio frequencies.

Specifically, there is a confirmed mapping relation between user identification cards and network standards, and between network standards and PLMNs. Therefore, when the mobile communication terminal determines the type of user identification card, the PLMN in compliance with the network standard supported by the mobile communication terminal can also be determined based on the type of user identification card.

S103: Network codes of the determined PLMN in compliance with the network standards supported by the mobile communication terminal are added to the EPLMN list.

In the embodiment of the present disclosure, an equivalent public land mobile network (EPLMN) is a PLMN that has the same status and level of priority as the PLMN currently chosen by the user's terminal. The EPLMN mainly solves problems related to user retention and roaming strategy in shared networks and original networks. Operators can deploy equivalent PLMNs so to realize sharing of communication network resources. From a business perspective, the practice realizes sharing of communication network resources among different PLMNs defined by the same operator or PLMNs of different operators.

In the embodiment of the present disclosure, the network identity can include network codes. For example, the network codes of China Mobile include: 46000, 46002, 46007, and 46008. The network codes of China Unicom include: 46001, 46006 and 46009.

Specifically, when the mobile communication device determines the network standard supported by it, the network identity of the network standard can be added into the EPLMN list.

S104: A communication connection between the mobile communication terminal and a matching PLMN is established if the matching PLMN is found to have a network identity that matches the network identity in the EPLMN list.

In the embodiment of the present disclosure, the mobile communication terminal scans and extracts the network identity of the PLMN broadcasted by the base station. It compares the network identity of the PLMN scanned and extracted with the network identities of PLMNs in the EPLMN list for a match. It there is a match, a communication connection between the mobile communication terminal and the matching PLMN will be established.

As shown in FIG. 1, after the type of user identification card inserted into a mobile communication terminal for the first time is detected, the PLMN in compliance with the network standard supported by the mobile communication terminal is determined based on the type of user identification card. The network identity of the determined PLMN in compliance with the network standard supported by the mobile communication terminal is added to an equivalent public land mobile network (EPLMN) list. Finally, when a PLMN matches a network identity in the EPLMN list, a communication connection between the mobile communication terminal and the matching PLMN is established. The embodiment of the present disclosure adds the network identities of the determined PLMN in compliance with the network standards supported by the mobile communication terminal into the EPLMN list. The EPLMN list stores network identities of PLMNs that are regarded as equivalent to a certain extent by the mobile communication terminal. Therefore, when the mobile communication terminal connects to a network based on the EPLMN list, which has stored network identities of PLMN in compliance with the network standards supported by the mobile communication terminal, it searches networks based on the current location when it is inserted with a user identification card for the first time. Thus it significantly heightens the chance of finding a PLMN whose network identity matches a network identity that is already stored in the EPLMN list during the process of network searching, as well as the possibility of the mobile communication terminal connecting to a network at the current location. It is instrumental in minimizing the waiting time when users are communicating (ideally, it only takes a few seconds for the mobile communication terminal to complete network connection), and thus is instrumental in greatly improve users' communication experience.

Figure 2:
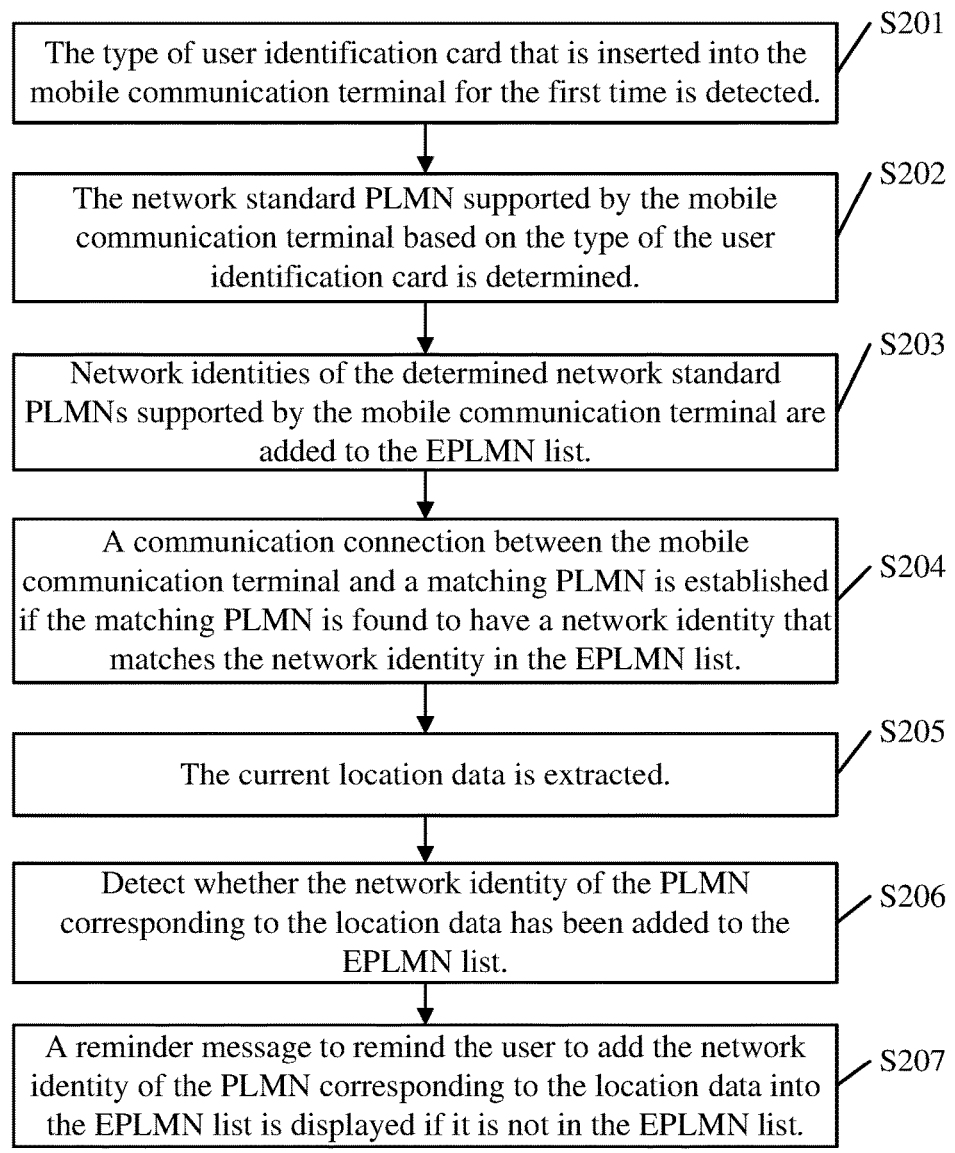
FIG. 2 is a flow chart of the method for accessing to a network according to another embodiment of the present disclosure.

Please refer to FIG. 2. FIG. 2 is a flow chart of the method for accessing to a network according to another embodiment of the present disclosure. The method for accessing to a network includes following blocks:

S201: The type of user identification card that is inserted into the mobile communication terminal for the first time is detected.

In the embodiment of the present disclosure, the mobile communication terminals include but are not limited to smart phones (e.g. android phones, iOS phones, and so on).

In the embodiment of the present disclosure, detecting the type of user identification card is to determine network standards that the mobile communication terminal supports. Network standard refers to the type of the network. Types of network standards commonly seen in China are code division multiple access (CDMA), with mobile phones using CDMA 1× at frequency band 800 MHz; global system for mobile communication (GSM), with mobile phones using frequency bands 900/1800/1900 MHZ; GSM 1× dual-mode (i.e. wideband CDMA, WCDMA) in the recent two years, taking frequency bands 900/1800 HMZ; 3G mobile communication technology, taking frequency bands 900/1800/1900/2100 HMZ; and 4G technology, taking frequency bands 1920-2170 MHZ.

In the embodiment of the present disclosure, a user identification card can be a subscriber identity module (SIM) card. More specifically, when the mobile communication terminal powers on, the first thing it detects is the type of user identification card inserted into the socket of the mobile communication terminal.

S202: The PLMN in compliance with the network standard supported by the mobile communication terminal based on the type of the user identification card is determined.

In the embodiment of the present disclosure, PLMN is a network built and operated by the government or operators approved by the government for the purpose of providing land-bound mobile communication services for the public. The network is usually connected to PSTN, forming a communication network that covers a whole region or country. For example, the network identity of PLMN of China Mobile is 46000, and the network identity of China Unicom is 46001. PLMN is a wireless communication system, inclined to be accessed by land-bound users riding on transportation tools or moving on foot. Such a system can be independent, but it is usually connected to a landline telephone system, such as PSTN. However, there are also more and more mobile and portable Internet users. An ideal PLMN system provides services to mobile and portable users equivalent to that provides to landline users. It can be especially challenging in areas with complicated terrains, because it is difficult to find and maintain a base station. There are also many obstacles in an urban environment, such as noises and interfering radiation that can be evoked by buildings and radio frequencies.

Specifically, there is a confirmed mapping relation between user identification cards and network standards, and between network standards and PLMNs. Therefore, when the mobile communication terminal determines the type of user identification card, the PLMN in compliance with the network standard supported by the mobile communication terminal can also be determined based on the type of user identification card.

S203: Network codes of the determined PLMN in compliance with the network standards supported by the mobile communication terminal are added to the EPLMN list.

In the embodiment of the present disclosure, an equivalent public land mobile network (EPLMN) is a PLMN that has the same status and level of priority as the PLMN currently chosen by the user's terminal. The EPLMN mainly solves problems related to user retention and roaming strategy in shared networks and original networks. Operators can deploy equivalent PLMNs so to realize sharing of communication network resources. From a business perspective, the practice realizes sharing of communication network resources among different PLMNs defined by the same operator or PLMNs of different operators.

In the embodiment of the present disclosure, the network identity can include network codes. For example, the network codes of China Mobile include: 46000, 46002, 46007, and 46008. The network codes of China Unicom include: 46001, 46006 and 46009.

Specifically, when the mobile communication device determines the network standard supported by it, the network identity of the network standard can be added into the EPLMN list.

S204: A communication connection between the mobile communication terminal and a matching PLMN is established if the matching PLMN is found to have a network identity that matches the network identity in the EPLMN list.

In the embodiment of the present disclosure, the mobile communication terminal scans and extracts the network identity of the PLMN broadcasted by the base station. It compares the network identity of the PLMN scanned and extracted with the network identities of PLMNs in the EPLMN list for a match. It there is a match, a communication connection between the mobile communication terminal and the matching PLMN will be established.

S205: The current location data is extracted.

In the embodiment of the present disclosure, the mobile communication terminal can extract the current location data based on an iconic building sits on the current location, or the location's geographical longitude and latitude.

S206: Detect whether the network identity of the PLMN corresponding to the location data has been added to the EPLMN list.

In the embodiment of the present disclosure, when the current location data of the mobile communication terminal is determined, so is the network identity of the PLMN corresponding to the location data. To shorten the time needed to search a network, the embodiment can also detect whether the network identity of the PLMN corresponding to the location data has been added to the EPLMN list. For example, when a user confirmed that he is at some residence community based on the location data, and the network identity range of the residence community is 46000, 46000 will be added into the EPLMN list by the terminal.

S207: A reminder message to remind the user to add the network identity of the PLMN corresponding to the location data into the EPLMN list is displayed if it is not in the EPLMN list.

In the embodiment of the present disclosure, when the mobile communication terminal detects that the network identity of the PLMN corresponding to the current location data has not been added into the EPLMN list, it can output a reminder message to remind the user to add the network identity of the PLMN corresponding to the location data to the EPLMN list. The reminder can be outputted as a voice or text message, or a voice message and a text message at the same time. The present disclosure does not specify any limit on the type of reminder message outputted.

As an optional method of implementation, when a PLMN is found to match the network identity in the EPLMN list, a communication connection between the mobile communication terminal and the matching PLMN is established. Afterwards, for a fast and accurate search of the PLMN, the EPLMN list is stored in the mobile communication terminal or user identification card.

In the embodiment of the present disclosure, a reminder message reminding the user of the time needed to connect to the network this time can be outputted. The reminder can be outputted as a voice or text message, or a voice message and a text message at the same time. The present disclosure does not specify any limit on the type of reminder message outputted.

FIG. 2 explained in detail that after the communication connection is established between the mobile communication terminal and the matching PLMN, the mobile communication terminal can also detect whether the network identity of the PLMN corresponding to the current location data has been added into the EPLMN list. If not, the mobile communication terminal will output a reminder message to remind the user to add the network identity of the PLMN corresponding to the location data into the EPLMN list. When the embodiment of the present disclosure is put into practice, the newly established EPLMN list can also be stored into the terminal or the user identification card. When users need to search for networks, the search can be conducted based on the EPLMN list, thus reduces the time needed to search for networks and improves user experience.

Figure 3:
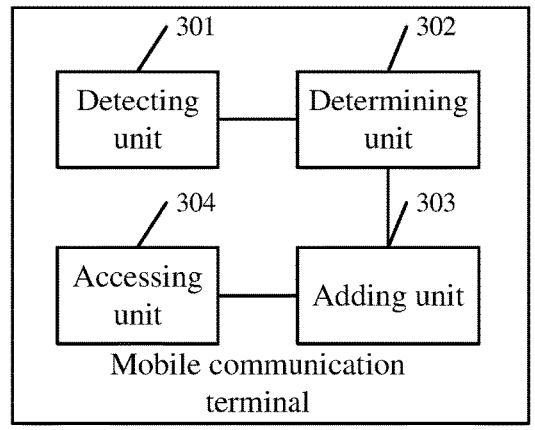
FIG. 3 is a block diagram of a mobile communication terminal according to a first embodiment of the present disclosure.

Please refer to FIG. 3. FIG. 3 is a block diagram of a mobile communication terminal according to a first embodiment of the present disclosure.

As shown in FIG. 3, the mobile communication terminal includes a detecting unit 301, a determining unit 302, an adding unit 303, and an accessing unit 304.

The detecting unit 301 is used to detect the type of the user identification card inserted into the mobile communication terminal for the first time.

In the embodiment of the present disclosure, detecting the type of user identification card is to determine network standards that the mobile communication terminal supports. Network standard refers to the type of the network. Types of network standards commonly seen in China are code division multiple access (CDMA), with mobile phones using CDMA 1× at frequency band 800 MHz; global system for mobile communication (GSM), with mobile phones using frequency bands 900/1800/1900 MHZ; GSM 1× dual-mode (i.e. wideband CDMA, WCDMA) in the recent two years, taking frequency bands 900/1800 HMZ; 3G mobile communication technology, taking frequency bands 900/1800/1900/2100 HMZ; and 4G technology, taking frequency bands 1920-2170 MHZ.

In the embodiment of the present disclosure, a user identification card can be a subscriber identity module (SIM) card. More specifically, when the mobile communication terminal powers on, the detecting unit 301 detects is the type of user identification card inserted into the socket of the mobile communication terminal.

The determining unit 302 is used to determine the PLMN in compliance with the network standard supported by the mobile communication unit based on the type of the user identification card detected by the detecting unit 301.

In the embodiment of the present disclosure, PLMN is a network built and operated by the government or operators approved by the government for the purpose of providing land-bound mobile communication services for the public. The network is usually connected to PSTN, forming a communication network that covers a whole region or country. For example, the network identity of PLMN of China Mobile is 46000, and the network identity of China Unicom is 46001. PLMN is a wireless communication system, inclined to be accessed by land-bound users riding on transportation tools or moving on foot. Such a system can be independent, but it is usually connected to a landline telephone system, such as PSTN. However, there are also more and more mobile and portable Internet users. An ideal PLMN system provides services to mobile and portable users equivalent to that provides to landline users. It can be especially challenging in areas with complicated terrains, because it is difficult to find and maintain a base station. There are also many obstacles in an urban environment, such as noises and interfering radiation that can be evoked by buildings and radio frequencies.

Specifically, there is a confirmed mapping relation between user identification cards and network standards, and between network standards and PLMNs. Therefore, when the mobile communication terminal determines the type of user identification card, the PLMN in compliance with the network standard supported by the mobile communication terminal can also be determined based on the type of user identification card.

The adding unit 303 is used to add the network identity of the PLMN in compliance with the network standard determined by the determining unit 302 to the EPLMN list In the embodiment of the present disclosure, an equivalent public land mobile network (EPLMN) is a PLMN that has the same status and level of priority as the PLMN currently chosen by the user's terminal. The EPLMN mainly solves problems related to user retention and roaming strategy in shared networks and original networks. Operators can deploy equivalent PLMNs so to realize sharing of communication network resources. From a business perspective, the practice realizes sharing of communication network resources among different PLMNs defined by the same operator or PLMNs of different operators.

In the embodiment of the present disclosure, the network identity can include network codes. For example, the network codes of China Mobile include: 46000, 46002, 46007, and 46008. The network codes of China Unicom include: 46001, 46006 and 46009.

Specifically, when the determining unit 302 determines the network standard supported by mobile communication device, the adding unit 303 adds the network identity of the network standard into the EPLMN list.

The accessing unit 304 is used to establish a communication connection between the mobile communication terminal and a matching PLMN when the matching PLMN is found to match the network identity in the EPLMN list after the adding unit has added network identities into the EPLMN list.

In the embodiment of the present disclosure, the accessing unit 304 is used to scan and extract network identities of PLMNs broadcasted by the base station. The accessing unit 304 is further used to compare the network identity of the PLMN scanned and extracted by the network identity extracting unit with the network identities of PLMNs in the EPLMN list for a match. The accessing unit 304 is further used to establish a communication connection between the mobile communication terminal and the matching PLMN when the matching unit successfully finds a match.

In FIG. 3 of the present disclosure, after the detecting unit 301 is used to detect the type of user identification card inserted into a mobile communication terminal for the first time, the determining unit 302 determines the PLMN in compliance with the network standard supported by the mobile communication terminal based on the type of user identification card. The adding unit 303 adds the network identity of the determined PLMN in compliance with the network standard supported by the mobile communication terminal to an equivalent public land mobile network (EPLMN) list. Finally, when a PLMN matches a network identity in the EPLMN list, the accessing unit 304 establishes a communication connection between the mobile communication terminal and the matching PLMN. The adding unit 303 adds the network identities of the determined PLMN in compliance with the network standards supported by the mobile communication terminal into the EPLMN list. The EPLMN list stores network identities of PLMNs that are regarded as equivalent to a certain extent by the mobile communication terminal. Therefore, when the mobile communication terminal connects to a network based on the EPLMN list, which has stored network identities of PLMN in compliance with the network standards supported by the mobile communication terminal, it searches networks based on the current location when it is inserted with a user identification card for the first time. Thus it significantly heightens the chance of finding a PLMN whose network identity matches a network identity that is already stored in the EPLMN list during the process of network searching, as well as the possibility of the mobile communication terminal connecting to a network at the current location. It is instrumental in minimizing the waiting time when users are communicating (ideally, it only takes a few seconds for the mobile communication terminal to complete network connection), and thus is instrumental in greatly improve users' communication experience.

Figure 4:
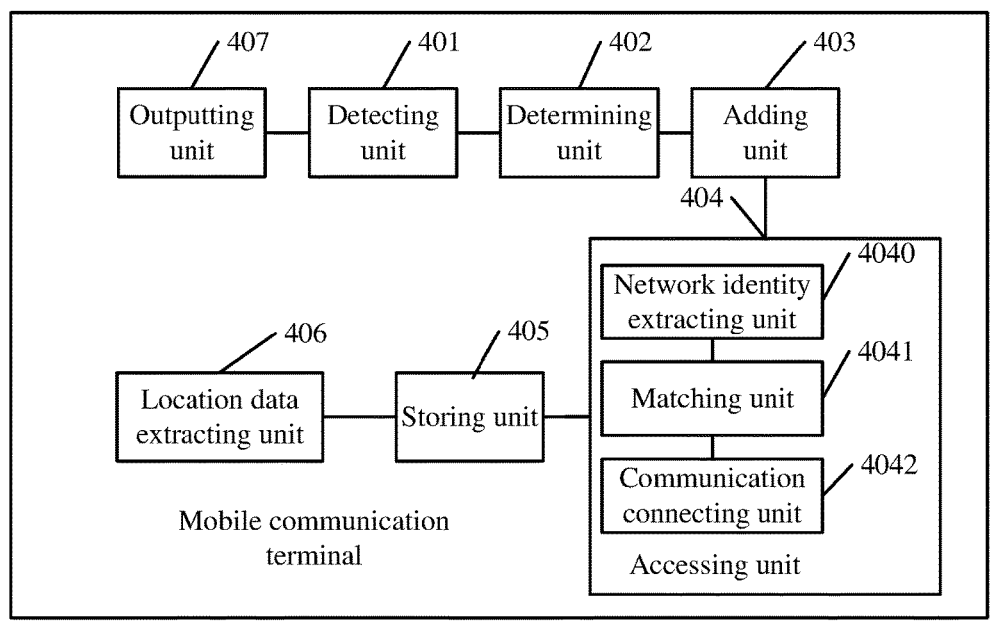
FIG. 4 is a block diagram of a mobile communication terminal according to a second embodiment of the present disclosure.

Please refer to FIG. 4. FIG. 4 is a block diagram of a mobile communication terminal according to a second embodiment of the present disclosure for implementing the method for accessing to a network. As shown in FIG. 4, the mobile communication terminal includes a detecting unit 401, a determining unit 402, an adding unit 403, an accessing unit 404, a storing unit 405, a location data extracting unit 406, and an outputting unit 407.

The detecting unit 401 is used to detect the type of the user identification card inserted into the mobile communication terminal for the first time.

In the embodiment of the present disclosure, the mobile communication terminals include but are not limited to smart phones (e.g. android phones, iOS phones, and so on).

In the embodiment of the present disclosure, detecting the type of user identification card is to determine network standards that the mobile communication terminal supports. Network standard refers to the type of the network. Types of network standards commonly seen in China are code division multiple access (CDMA), with mobile phones using CDMA 1× at frequency band 800 MHz; global system for mobile communication (GSM), with mobile phones using frequency bands 900/1800/1900 MHZ; GSM 1× dual-mode (i.e. wideband CDMA, WCDMA) in the recent two years, taking frequency bands 900/1800 HMZ; 3G mobile communication technology, taking frequency bands 900/1800/1900/2100 HMZ; and 4G technology, taking frequency bands 1920-2170 MHZ.

In the embodiment of the present disclosure, a user identification card can be a subscriber identity module (SIM) card. More specifically, when the mobile communication terminal powers on, the detecting unit 401 detects is the type of user identification card inserted into the socket of the mobile communication terminal.

The determining unit 402 is used to determine the PLMN in compliance with the network standard supported by the mobile communication unit based on the type of the user identification card detected by the detecting unit 401.

In the embodiment of the present disclosure, PLMN is a network built and operated by the government or operators approved by the government for the purpose of providing land-bound mobile communication services for the public. The network is usually connected to PSTN, forming a communication network that covers a whole region or country. For example, the network identity of PLMN of China Mobile is 46000, and the network identity of China Unicom is 46001. PLMN is a wireless communication system, inclined to be accessed by land-bound users riding on transportation tools or moving on foot. Such a system can be independent, but it is usually connected to a landline telephone system, such as PSTN. However, there are also more and more mobile and portable Internet users. An ideal PLMN system provides services to mobile and portable users equivalent to that provides to landline users. It can be especially challenging in areas with complicated terrains, because it is difficult to find and maintain a base station. There are also many obstacles in an urban environment, such as noises and interfering radiation that can be evoked by buildings and radio frequencies.

Specifically, there is a confirmed mapping relation between user identification cards and network standards, and between network standards and PLMNs. Therefore, when the mobile communication terminal determines the type of user identification card, the PLMN in compliance with the network standard supported by the mobile communication terminal can also be determined based on the type of user identification card.

The adding unit 403 is used to add the network identity of the PLMN in compliance with the network standard determined by the determining unit 402 to the EPLMN list In the embodiment of the present disclosure, an equivalent public land mobile network (EPLMN) is a PLMN that has the same status and level of priority as the PLMN currently chosen by the user's terminal. The EPLMN mainly solves problems related to user retention and roaming strategy in shared networks and original networks. Operators can deploy equivalent PLMNs so to realize sharing of communication network resources. From a business perspective, the practice realizes sharing of communication network resources among different PLMNs defined by the same operator or PLMNs of different operators.

In the embodiment of the present disclosure, the network identity can include network ranges. For example, the network identities of China Mobile include four ranges: 46000, 46002, 46007, and 46008. The network identities of China Unicorn include three ranges: 46001, 46006 and 46009.

Specifically, when the determining unit 402 determines the network standard supported by mobile communication device, the adding unit 403 adds the network identity of the network standard into the EPLMN list.

The accessing unit 404 is used to establish a communication connection between the mobile communication terminal and a matching PLMN when the matching PLMN is found to match the network identity in the EPLMN list after the adding unit has added network identities into the EPLMN list.

As an optional method of implementation, the accessing unit 404 can further be divided into a network identity extracting unit 4040, a matching unit 4041 and a communication accessing unit 4042.

The network identity extracting unit 4040 is used to scan and extract network identities of PLMNs broadcasted by the base station.

The matching unit 4041 is used to compare the network identity of the PLMN scanned and extracted by the network identity extracting unit with the network identities of PLMNs in the EPLMN list for a match;

The communication accessing unit 4042 is used to establish a communication connection between the mobile communication terminal and the matching PLMN when the matching unit successfully finds a match.

The storing unit 405 is used to store the EPLMN list, with network identities added by the adding unit, into the mobile communication terminal or user identification card after the accessing unit establishes the communication connection between the mobile communication terminal and the matching PLMN.

The location data extracting unit 406 is used to extract the current location data.

In the embodiment of the present disclosure, the location data extracting unit 406 can extract the current location data based on an iconic building sits on the current location, or the location's geographical longitude and latitude.

Optionally, the detecting unit 401 also detects whether the network identity of the PLMN corresponding to the location data has been added to the EPLMN list.

In the embodiment of the present disclosure, when the current location data of the mobile communication terminal is determined, so is the network identity of the PLMN corresponding to the location data. To shorten the time needed to search a network, the detecting unit 401 can also detect whether the network identity of the PLMN corresponding to the location data has been added to the EPLMN list. For example, when a user confirmed that he is at some residence community based on the location data, and the network identity range of the residence community is 46000, 46000 will be added into the EPLMN list by the terminal.

The outputting unit 407 is used to output a reminder message to remind the user to add the network identity of the PLMN corresponding to the location data into the EPLMN list when the detecting unit 401 detects that the network identity of the PLMN corresponding to the current location data is not included in the EPLMN list. The reminder can be outputted as a voice or text message, or a voice message and a text message at the same time. The present disclosure does not specify any limit on the type of reminder message outputted.

Optionally, when a PLMN is found to match the network identity in the EPLMN list, the accessing unit 404 establishes a communication connection between the mobile communication terminal and the matching PLMN. Afterwards, for a fast and accurate search of the PLMN, the EPLMN list is stored in the mobile communication terminal or user identification card.

In the embodiment of the present disclosure, the outputting unit 407 is also used to output a reminder message reminding the user of the time needed to connect to the network this time can be outputted. The reminder can be outputted as a voice or text message, or a voice message and a text message at the same time. The present disclosure does not specify any limit on the type of reminder message outputted.

FIG. 4 explained in detail that after the accessing unit 404 establishes the communication connection between the mobile communication terminal and the matching PLMN, the detecting unit 401 can also detect whether the network identity of the PLMN corresponding to the current location data has been added into the EPLMN list. If not, the outputting unit 407 will output a reminder message to remind the user to add the network identity of the PLMN corresponding to the location data into the EPLMN list. When the embodiment of the present disclosure is put into practice, the newly established EPLMN list can also be stored into the terminal or the user identification card. When users need to search for networks, the search can be conducted based on the EPLMN list, thus reduces the time needed to search for networks and improves user experience.

Figure 5:
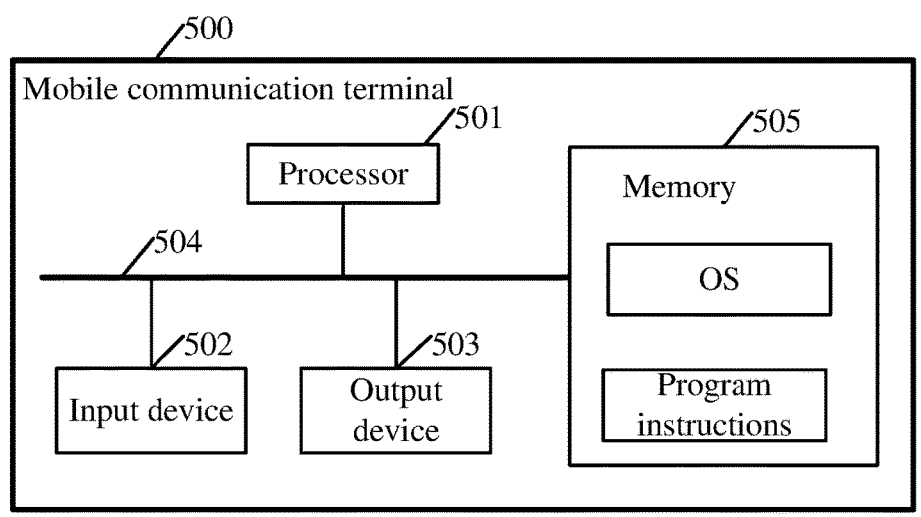
FIG. 5 is a block diagram of a mobile communication terminal according to a third embodiment of the present disclosure.

FIG. 5 is a schematic diagram of a structure of still another mobile communication terminal according to one embodiment of the present disclosure. The mobile communication terminal is configured to perform the above network access methods. A mobile communication terminal 500 may include: elements such as at least one processor 501, at least one input device 502, at least one output device 503, and a memory 505. These elements are communicatively connected through one or a plurality of buses 504. Those of ordinary skill in the art would understand that the embodiment of the present disclosure is not limited to the structure of the mobile communication terminal shown in FIG. 5. It may be either a bus-type structure or a star-type structure, or may include more or fewer elements than illustrated, or some elements may be combined, or the elements may be arranged differently. The processor 501 is a control center of the mobile communication terminal 500. The processor 501 is connected to various parts of the mobile communication terminal 500 by utilizing various interfaces and circuits. Through running or executing program instructions and/or modules stored in the memory 505, and using data stored in the memory 505, the processor 501 performs a variety of functions of the mobile communication terminal and processes data. The processor 501 may be constituted by an integrated circuit (IC), for example, it may be formed by a single packaged IC, or may be formed by connecting a plurality of packaged ICs having a same function or different functions. For example, the processor 501 may only include a central processing unit (CPU), or may be a combination of a CPU, a digital signal processor (DSP), a graphic processing unit (GPU), and various types of control chips. In the embodiment of the present disclosure, the CPU may be a single-core CPU or may include a multi-core CPU.

The input device 502 includes a standard touch panel, a standard keyboard, etc., and may also include a wired interface, a wireless interface, etc.

The output device 503 includes a display panel, a speaker, etc., and may also include a wired interface, a wireless interface, etc.

The memory 505 may be configured to store a software program and the module. The processor 501, the input device 502, and the output device 503 performs a variety of functional applications of the mobile communication terminal and achieve data processing through using the software program and the module stored in the memory 505. The memory 505 mainly includes a program storage area and a data storage area. The program storage area may store an operating system, an application program required by at least one function, or the like. The data storage area may store data or the like created according to uses of the mobile communication terminal. In the embodiment of the present disclosure, the operating system may be an Android system, an iOS system, a Windows operating system, or the like.

Specifically, the processor 501 executes the program instructions stored in the memory 505 to perform the following operations:

detecting a type of user identification card inserted into a mobile communication terminal in a first time;

determining a public land mobile network (PLMN) in compliance with a network standard supported by the mobile communication terminal based on the type of user identification card;

adding a network identity of the determined PLMN in compliance with the network standard supported by the mobile communication terminal to an equivalent public land mobile network (EPLMN) list;

establishing a communication connection between the mobile communication terminal and a matching PLMN upon a condition that the matching PLMN is found to match the network identity in the EPLMN list.

The processor 501 also executes the program instructions stored in the memory 505 to perform the following step:

storing the EPLMN list to the mobile communication terminal or the user identification card.

The processor 501 also executes the program instructions stored in the memory 505 to perform the following steps:

extracting a current location data;

detecting whether a network identity of a PLMN corresponding to the location data has been added to the EPLMN list;

outputting a reminder message to remind the user to add the network identity of the PLMN corresponding to the location data to the EPLMN list if it is not in the EPLMN list.

When the processor executes the program instructions to establish the communication connection between the mobile communication terminal and a matching PLMN upon a condition that the matching PLMN is found to match the network identity in the EPLMN list, the processor executes the program instructions to perform following steps:

scanning network identities of PLMNs broadcasted by a base station;

comparing the scanned network identities of the PLMNs with the network identities of PLMNs in the EPLMN list;

establishing a communication connection between the mobile communication terminal and the matching PLMN if there is a match.

The processor 501 also executes the program instructions stored in the memory 505 to perform the following step:

outputting a reminder message to remind the user of a time needed to connect to the network this time.

Specifically, the embodiment of the present disclosure introduces a terminal that can implement part or all of the procedure of the method for accessing to a network introduced by the present disclosure in combined with FIGS. 1 and 2

All the modules or submodules of the embodiments of the present disclosure can be realized by general integrated circuits, such as central processing unit (CPU) or application specific integrated circuit (ASIC).

The blocks of the embodiments of the present disclosure can be adjusted, combined or deleted based on real needs.

The units of the terminal in the embodiments of the present disclosure can be combined, divided or deleted based on real needs.

An ordinary technician of this field understands that part or all of the procedure of the embodiments can be completed by commanding relevant hardware through computer programs. The program can be stored in a computer readable storage medium. Procedures of the embodiments of the methods can be included when the program is operating. Wherein the storage medium can be a disk, CD, read-only memory (ROM), or random access memory (RAM).

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A method for accessing to a network, comprising:
    detecting a type of user identification card inserted into a mobile communication terminal in a first time;
    determining a public land mobile network (PLMN) in compliance with a network standard supported by the mobile communication terminal based on the type of user identification card;
    adding a network identity of the determined PLMN in compliance with the network standard supported by the mobile communication terminal to an equivalent public land mobile network (EPLMN) list; and
    establishing a communication connection between the mobile communication terminal and a matching PLMN upon a condition that the matching PLMN is found to match the network identity of the determined PLMN in the EPLMN list.

2. The method of claim 1, wherein after a step of establishing a communication connection between the mobile communication terminal and a matching PLMN upon a condition that the matching PLMN is found to match the network identity in the EPLMN list, the method further comprises:
    storing the EPLMN list to the mobile communication terminal or the user identification card.

3. The method of claim 2, further comprising:
extracting a current location data;
detecting whether a network identity of a PLMN corresponding to the location data has been added to the EPLMN list;
outputting a reminder message to remind the user to add the network identity of the PLMN corresponding to the location data to the EPLMN list if it is not in the EPLMN list.

4. The method of claim 1, wherein the step of establishing a communication connection between the mobile communication terminal and a matching PLMN upon a condition that the matching PLMN is found to match the network identity in the EPLMN list comprises:
scanning network identities of PLMNs broadcasted by a base station;
comparing the scanned network identities of the PLMNs with the network identity of PLMN in the EPLMN list;
establishing, upon a condition that one of the scanned network identities matches the network identity of PLMN in the EPLMN list, the communication connection between the mobile communication terminal and the matching PLMN mapping the matched network identity.

5. The method of claim 4, further comprising:
outputting a reminder message to remind the user of a time needed to connect to the network this time.

6. A mobile communication terminal, comprising:
a detecting unit, configured to detect a type of user identification card inserted into a mobile communication terminal in a first time;
a determining unit, configured to determine a public land mobile network (PLMN) in compliance with a network standard supported by the mobile communication terminal based on the type of user identification card detected by the detecting unit;
an adding unit, configured to add a network identity of the determined PLMN in compliance with the network standard supported by the mobile communication terminal to an equivalent public land mobile network (EPLMN) list;
an accessing unit, configured to establish a communication connection between the mobile communication terminal and a matching PLMN if the matching PLMN is found to match the network identity of the determined PLMN in the EPLMN list after the network identity have been added into the list by the adding unit.

7. The mobile communication terminal of claim 6, further comprising:
a storing unit, configured to store the EPLMN list after the network identities have been added into the list by the adding unit into the mobile communication terminal or the user identification card after the accessing unit establishes the communication connection between the mobile communication terminal and the matching PLMN.

8. The mobile communication terminal of claim 7, further comprising:
a location data extracting unit, configured to extract current location data;
wherein the detecting unit is further configured to detect whether the network identity of the PLMN corresponding to the location data extracted by the location data extracting unit has been added to the EPLMN list;
the mobile communication terminal further comprises:
an outputting unit, configured to output a reminder message to remind the user to add the network identity of the PLMN corresponding to the location data into the EPLMN list if the detecting unit detects that the network identity of the PLMN corresponding to the location data has not been added to the EPLMN list.

9. The mobile communication terminal of claim 6, wherein the accessing unit comprises:
a network identity extracting unit, configured to scan network identities of PLMNs broadcasted by a base station;
a matching unit, configured to compare the network identities of the PLMNs scanned by the network identity extracting unit with the network identity of the PLMN in the EPLMN list;
a communication accessing unit, configured to establish, upon a condition that one of the scanned network identities matches the network identity of PLMN in the EPLMN list, the communication connection between the mobile communication terminal and the matching PLMN mapping the matched network identity.

10. The mobile communication terminal of claim 9, wherein the outputting unit is further configured to output a reminder message to remind the user of a time needed to connect to the network this time.

11. A mobile communication terminal comprising a processor and a memory configured to store program instructions, wherein the processor executes the program instructions to detect a type of user identification card inserted into a mobile communication terminal in a first time; the processor executes the program instructions to determine a public land mobile network (PLMN) in compliance with a network standard supported by the mobile communication terminal based on the type of user identification card; the processor executes the program instructions to add a network identity of the determined PLMN in compliance with the network standard supported by the mobile communication terminal to an equivalent public land mobile network (EPLMN) list; and the processor executes the program instructions to establish a communication connection between the mobile communication terminal and a matching PLMN upon a condition that the matching PLMN is found to match the network identity of the determined PLMN in the EPLMN list.

12. The mobile communication terminal of claim 11, wherein after the processor executes the program instructions to establish the communication connection between the mobile communication terminal and a matching PLMN upon a condition that the matching PLMN is found to match the network identity in the EPLMN list, the memory is further configured to store the EPLMN list to the mobile communication terminal or the user identification card.

13. The mobile communication terminal of claim 12, wherein the processor executes the program instructions to perform following steps:
extracting a current location data;
detecting whether a network identity of a PLMN corresponding to the location data has been added to the EPLMN list;
outputting a reminder message to remind the user to add the network identity of the PLMN corresponding to the location data to the EPLMN list if it is not in the EPLMN list.

14. The mobile communication terminal of claim 11, wherein when the processor executes the program instructions to establish the communication connection between the mobile communication terminal and a matching PLMN upon a condition that the matching PLMN is found to match the network identity in the EPLMN list, the processor executes the program instructions to perform following steps:
- scanning network identities of PLMNs broadcasted by a base station;
- comparing the scanned network identities of the PLMNs with the network identity of PLMN in the EPLMN list;
- establishing, upon a condition that one of the scanned network identities matches the network identity of PLMN in the EPLMN list, the communication connection between the mobile communication terminal and the matching PLMN mapping the matched network identity.

15. The mobile communication terminal of claim 14, wherein the processor executes the program instructions to perform a following step:
- outputting a reminder message to remind the user of a time needed to connect to the network this time.

\* \* \* \* \*